United States Patent [19]

Albert et al.

[11] Patent Number: 4,946,762

[45] Date of Patent: Aug. 7, 1990

[54] MONOSUBSTITUTED AND DISUBSTITUTED PHTHALOCYANINES

[75] Inventors: Bernhard Albert, Maxdorf; Harald Kuppelmaier, Heidelberg; Gerhard Wagenblast, Frankenthal, all of Fed. Rep. of Germany

[73] Assignee: BASF Aktiengesellschaft, Ludwigshafen, Fed. Rep. of Germany

[21] Appl. No.: 316,610

[22] Filed: Feb. 24, 1989

Related U.S. Application Data

[62] Division of Ser. No. 134,100, Dec. 17, 1987, abandoned.

[30] Foreign Application Priority Data

Dec. 20, 1986 [DE] Fed. Rep. of Germany ....... 3643770

[51] Int. Cl.$^5$ .......................... G11B 7/24; G03C 1/72; G03C 5/16; B41M 5/26
[52] U.S. Cl. ..................................... 430/270; 430/495; 430/945; 346/135.1; 540/122
[58] Field of Search ................ 430/270, 495, 945, 58; 346/135.1

[56] References Cited

U.S. PATENT DOCUMENTS

| | | | |
|---|---|---|---|
| 4,061,654 | 12/1977 | Idelson | 540/122 |
| 4,241,355 | 12/1980 | Bloom et al. | 430/494 |
| 4,458,004 | 7/1984 | Tanikawa | 430/494 |
| 4,471,039 | 9/1984 | Borsenberger et al. | 430/58 |
| 4,492,750 | 1/1985 | Law et al. | 430/494 |
| 4,529,688 | 7/1985 | Law et al. | 430/494 |
| 4,798,781 | 1/1989 | Hirose et al. | 430/270 |
| 4,816,386 | 3/1989 | Gotoh et al. | 430/495 |

FOREIGN PATENT DOCUMENTS

| | | | |
|---|---|---|---|
| 0013453 | 7/1980 | European Pat. Off. | 430/494 |
| 0186404 | 7/1986 | European Pat. Off. | 430/494 |
| 11292 | 1/1984 | Japan . | |
| 154098 | 8/1985 | Japan . | |

OTHER PUBLICATIONS

Chemical Abstracts, vol. 104, Heft 4, p. 26842s, 1986.

*Primary Examiner*—Paul R. Michl
*Assistant Examiner*—Mark R. Buscher
*Attorney, Agent, or Firm*—Keil & Weinkauf

[57] ABSTRACT

Metal-containing or metalfree, monosubstituted or disubstituted phthalocyanines I which have one or two of the following radicals R as substituents on their benzene rings: R=bromine, cyano, $C_1$-$C_3$-alkyl, n-butyl, i-butyl, $C_5$-$C_{20}$-alkyl, $C_5$-$C_{10}$-cycloalkyl, fluorinated $C_1$-$C_6$-alkyl, $C_6$-$C_{20}$-aryl, $XR^1$, where X is oxygen, sulfur, selenium, tellurium or imino (NH) and $R^1$ is $C_1$-$C_6$-alkyl, fluorinated $C_1$-$C_6$-alkyl or $C_6$-$C_{20}$-aryl, or $Si(R^2)_3$, where $R^2$ is $C_1$-$C_6$-alkyl, each and every substituted benzene ring being substituted by only one R radical, are useful in Laser-optical recording materials.

28 Claims, No Drawings

MONOSUBSTITUTED AND DISUBSTITUTED PHTHALOCYANINES

This application is a division of application Ser. No. 134,100, filed on Dec. 17, 1987, now abandoned.

The present invention relates to a metal-containing or metal-free, monosubstituted or disubstituted phthalocyanine I which has one or two of the following radicals R as substituents on its benzene rings: R = bromine, cyano, $C_1$–$C_6$-alkyl, n-butyl, i-butyl, $C_5$–$C_{20}$-alkyl, $C_5$–$C_{10}$-cycloalkyl, fluorinated $C_1$–$C_6$-alkyl, $C_6$–$C_{20}$-aryl; $XR^1$, where X is oxygen, sulfur, selenium, tellurium or imino (NH) and $R^1$ is $C_1$–$C_6$-alkyl, fluorinated $C_1$–$C_6$-alkyl or $C_6$–$C_{20}$-aryl; or $Si(R^2)_3$, where $R^2$ is $C_1$–$C_6$-alkyl; each and every substituted benzene ring being substituted by only one R radical.

The present invention further relates to the use of a phthalocyanine I for producing a planar, multilayered, laser-optical recording material. The present invention also relates to a novel planar, multilayered, laser-optical recording material whose recording layers contain a phthalocyanine I. In addition, the present invention relates to a novel, improved process for laser-optical data recording using a planar, multilayered, laser-optical recording material whose recording layers contain a phthalocyanine I.

For the purposes of the present invention, an IR readable bar code is for example a bar code applied to goods packages for precise identification of the goods. Liquid crystal displays covers existing arrangements which contain layers of liquid-crystalline substances. On application of an electrical voltage, these layers alter locally in their optical properties, as a result of which for example numbers, letters or images can be visually displayed.

An IR security system is an arrangement which consists essentially of a laser light source and suitable detector at a spatial distance therefrom. In IR security systems, the laser beam emitted by the laser light source is incident upon the detector and forms a light barrier. If this barrier is broken, the detector causes an alarm to be triggered.

Electrophotographic recording materials contain essentially layers which have a high electrical resistance in the dark but become conductive on exposure to light. If such layers are electrostatically charged at their surface in the dark and then subjected to imagewise exposure, the electrostatic charge is drained in the exposed areas, and the result is an electrostatic image which can be made visible with the aid of a toner.

Laser-optical recording materials contain essentially a recording layer whose physical properties can be thermally altered locally by irradiation with a focussed laser beam. Thermally altered areas of the recording layer represent the data written in.

These areas can have the form of holes which penetrate through the whole of the recording layer, which case is referred to in general as ablative laser-optical data recording. On reading out the data using a read laser beam, use is made of the different reflectivities of the holes and of the unaltered areas of the recording layer. To obtain a high sensitivity and a high signal-to-noise ratio in this process, use can be made of a reflector layer which is bared by the process of hole formation and reflects the laser beam particularly strongly.

The thermally changed areas can also have the form of pits which may have a cleanly developed wall. This case is referred to as deformative laser-optical data recording. In this process, the data are read out via the diffraction of the light of the read laser beam at the pits.

Yet the thermal change can also produce areas where no ablation or deformation has taken place but a phase transformation of the material of the recording layer into another material modification. This case is referred to as laser-optical data recording by phase transformation. In general, the phase transformation has the effect of reducing the reflectivity in the areas in question and/or increasing the light transmittance. In certain circumstances, however, the opposite effect may occur, increasing the reflectivity and/or reducing the light transmittance. In what follows, the areas thermally altered in this way are referred to as spots.

For the purposes of the present invention, the term "planar" encompasses all spatial forms whose thickness is substantially less than their length and width. Accordingly, the recording materials in question here are ribbonlike, sheetlike or disklike, and in the last case they are indeed generally referred to as data disks.

The term "multilayered" indicates that the recording materials contain, in addition to the recording layer, one or more further layers which are likewise of importance for the function of the materials.

Monosubstituted and disubstituted phthalocyanines which contain as substituents tert.-butyl groups (cf. U.S. Pat. Nos. 4,492,750 and 4,529,688), fluorine atoms (cf. U.S. Pat. No. 4,458,004) or chlorine atoms (cf. DE-A-2,951,340) are known.

Phthalocyanines of this type, however, are only used for ablative or deformative laser-optical data recording. Ablative data recording by its very nature, requires the presence of a reflector layer, which strongly reflects the read laser beam, to produce a high signal-to-noise ratio. Deformative data recording, on the other hand, requires high accuracy in the production of the thickness of the recording layer and in the shape of the pits to obtain favorable conditions for the diffraction of the read laser beam. Here too the presence of a reflector layer may be necessary to obtain a high sensitivity and a high signal-to-noise ratio.

Laser-optical data recording by phase transformation of recording layers of unsubstituted and metal-free phthalocyanine or unsubstituted copper, cobalt or chloro-aluminum phthalocyanine is known from JP-A-60/154,098 (cf. Chem. Abstracts, 104 (4), (1986), 26842s). In this system use is made of recording layers of phthalocyanines of the α-modification which are locally transformed into the β-modification by irradiation with laser light of the wavelength λ=632.4 nm (write wavelength) and a light power of 5 mW with a pulse time of 20 ns. This reduces the transmittance of the layers for laser light of the wavelength λ'=714 nm (read wavelength) from 30 to 5%. The sensitivity and the signal-to-noise ratio of such recording materials, however, does not meet high standards; in particular the reflectivity contrast, ie. the difference in the reflectivity of the written areas (β-modification) and the unwritten areas (α-modification) at read wavelengths λ' above 714 nm, leaves something to be desired. In addition, recording layers of this type are only difficult to write with data at write wavelengths λ above 632.4 nm.

It is an object of the present invention to replace existing phthalocyanines by new monosubstituted and disubstituted phthalocyanines having improved application properties.

It is a further object of the present invention to provide new, planar, multilayered, laser-optical recording materials which are composed of thermally alterable recording layers and which are suitable not only for ablative and deformative data recording but also for data recording by phase transformation, where the latter should have higher sensitivity, in particular in the IR region, than the prior art, so that commercial semiconductor lasers can be used for this purpose.

It is also an object of the present invention to provide a process for laser-optical data recording whereby the thermally alterable, dye-containing recording layer of a planar, multilayered recording material is written with digital or analog data in the form of thermally altered areas using a write laser beam, whereafter the data written in can be read by means of a read laser beam by detecting the light transmitted o reflected by the recording material, and which is suitable in particular for reading and writing in the IR region by means of commercial semiconductor lasers.

We have found that these objects are achieved with the phthalocyanine I defined at the beginning.

We have further found a planar, multilayered, laser-optical recording material which has a thermally alterable recording layer which contains a phthalocyanine I.

We have also found a process for laser-optical data recording whereby the thermally alterable, dye-containing recording layer of a planar, multilayered recording material is written by means of a write laser beam with analog or digital data in the form of thermally altered areas, whereafter the written data can be read by means of a read laser beam by detecting the light transmitted or reflected by the recording material, and which comprises using for this purpose a planar, multilayered, laser-optical recording material containing a thermally alterable recording layer which contains a phthalocyanine I.

The phthalocyanine I according to the invention is monosubstituted or disubstituted by the radicals R. In the case of disubstitution, the radicals R in a molecule are generally identical on account of the method of preparation; however, it is also possible for the radicals R in one molecule to be different.

The phthalocyanine I can also be present as a mixture of monosubstituted and disubstituted phthalocyanines I with either identical or different radicals R being present in both. Moreover, the mixtures may have any desired composition, so that the number of radicals R per phthalocyanine skeleton can range arithmetically from 1 to 2, preferably from 1.01 to 1.99, in particular from 1.1 to 1.9.

Radicals R which are suitable according to the invention are bromine, cyano, $C_1$–$C_6$-alkyl, such as methyl, ethyl or i-propyl, n-butyl, i-butyl, $C_5$–$C_{20}$-alkyl, such as pentyl, hexyl, n-octyl, 1,1,3,3-tetramethylbutyl, decyl, dodecyl, pentadecyl or eicosanyl, $C_5$–$C_{10}$-cycloalkyl, such as cyclopentyl, cyclohexyl or methylcyclohexyl, fluorinated $C_1$–$C_6$-alkyl, such as trifluoromethyl, 2,2,2-trifluoroethyl, pentafluoroethyl, heptafluoropropyl, perfluorobutyl, perfluoropentyl or perfluorohexyl, $C_6$–$C_{20}$-aryl, such as phenyl, p-tolyl or naphthyl, $XR^1$- radicals where X is oxygen, sulfur, selenium or tellurium or imino (NH) and $R^1$ is $C_1$–$C_6$-alkyl, such as methyl, ethyl, i- or n-propyl, n-, i-or tert-butyl, pentyl, hexyl, n-octyl, 1,1,3,3-tetramethylbutyl or one of the aforementioned fluorinated $C_1$–$C_6$-alkyls or one of the aforementioned $C_6$–$C_{20}$-aryls, or $Si(R^2)_3$ radicals where $R^2$ is methyl or ethyl.

Radicals R which are preferred according to the invention are methyl, ethyl, 2,2,2-trifluoroethyl, 1,1,3,3-tetramethylbutyl, phenyl, p-tolyl, methoxy, ethoxy, 2,2,2-trifluoroethoxy, 1,1,3,3-tetramethylbutoxy, phenoxy, p-methylphenoxy and trimethylsilyl.

The phthalocyanine I can also be present in a metal-free form.

However, it can also be metal-containing with the phthalocyanine skeleton appearing as a ligand on divalent or trivalent metal cations or on cationic, metal-containing groups.

Examples of suitable cations or groups are magnesium, calcium, titanyl, vanadinyl, niobium, tantalum, chromium, manganese, iron, cobalt, nickel, palladium, platinum, zinc, cadmium, copper, tin, lead, hydroxoaluminum, chloroaluminum and dihydroxosilicon cations, of which titanyl and vanadinyl cations are particularly advantageous.

A metal-containing phthalocyanine I is advantageous.

Very particularly advantageous phthalocyanines I contain as radicals R methyl, ethyl, 2,2,2-trifluoroethyl, 1,1,3,3-tetramethylbutyl, phenyl, p-toluyl, methoxy, ethoxy, 2,2,2-trifluoroethoxy, 1,1,3,3-tetramethylbutoxy, phenoxy, p-methylphenoxy or trimethylsilyl and as cations titanyl or vanadinyl cations.

The preparation of phthalocyanine I requires no special measures, being accomplishable by a conventional method for synthesizing substituted phthalocyanines.

This generally comprises heating mixtures which contain essentially from 50 to 500 moles of o-phthalodinitrile and from 5 to 100 moles of an o-phthalodinitrile which is substituted by a radical R in the presence or absence of a metal oxide or halide of one of the above-mentioned metals at from 200° to 300° C. for from 2 to 10 hours. To the reaction mixtures may be added suitable substances such as urea or catalysts such as ammonium molybdates.

After cooling down, the crude products are heated together with acids, customarily 10% strength hydrochloric acid, and then with aqueous alkalis, for example 10% strength ammonia, and the impurities dissolve. If necessary, the crude products can thereafter be heated a further time with methanol. The products thus obtained are customarily dried. However, the crude products can also be dissolved in sulfuric acid and thus separated from the sulfuric acid insoluble impurities present therein by filtration or centrifuging. Thereafter the sulfuric acid product solution is poured into ice-water, and the products precipitate. The precipitated products are filtered or centrifuged off and washed neutral with water. The products are subsequently dried.

The products are extracted with halohydrocarbons such as methylene chloride to isolate the mixtures of monosubstituted and disubstituted phthalocyanines I. The mixtures can be separated by column chromatography into the corresponding monosubstituted and disubstituted phthalocyanines I.

The phthalocyanines I have very good application properties and therefore are useful for many purposes. In particular, they can be used for producing IR screen layers, IR-absorbent films, sunscreen coatings, coatings for automotive windscreens, IR inks, printing inks for IR-readable bar codes, liquid crystal displays, IR security systems or electrophotographic recording materials. They are particularly highly suitable for producing the planar, multilayered, laser-optical recording material according to the invention.

An essential constituent of the recording material according to the invention is its thermally alterable recording layer which contains a phthalocyanine I.

Such a recording layer may also contain further suitable components such as known dyes or binders.

Suitable known dyes which can be used together with the phthalocyanines I come from the classes of the azo, perylene, anthraquinone, cyanine, porphine, tetrazaporphine, hemiporphyrazine, phthalocyanine and tetrathiolato metal complex dyes, the known phthalocyanines being highly suitable.

Examples of highly suitable known phthalocyanines are metal-free phthalocyanine and copper, cobalt, titanyl, chloroaluminum or vandinyl phthalocyanine and the phthalocyanines disclosed in U.S. Pat. Nos. 4,529,688, 4,492,750, DE-A-2,951,340, EP-A-0,013,353, DE-A-3,446,418 or EP-A-0,186,404.

Suitable binders are polymers which are compatible with the dyes and the phthalocyanines I.

Examples of suitable binders are polystyrenes, polyesters, polyacrylates, polymethacrylates, polycarbonates, polyamines, polyvinyl alcohols, polyvinyl chlorides, copolymers of vinyl chloride and vinyl acetate, and polymers and copolymers containing liquid crystalline side groups as described in EP-A-0,090,282 or EP-A-0,171,045.

In addition, the recording layers may contain further suitable additives, for example low molecular weight liquid crystalline compounds.

Of advantage are amorphous recording layers which consist of the known dyes and the phthalocyanines I, where the proportion of phthalocyanine I in the layers is not less than 20% by weight.

Moreover, amorphous recording layers which consist of the known phthalocyanines and the phthalocyanines I are of particular advantage and those which consist solely of the phthalocyanines I are of very particular advantage. Of these, noteworthy are in turn those which consist of the particularly advantageous phthalocyanines I.

The term "amorphous" indicates that the material of the recording layers has no crystalline regions larger than the thermally altered regions, but is optically isotropic in this order of magnitude.

The recording layers are in general from 50 to 160, preferably from 80 to 140, in particular from 100 to 130, nm in thickness.

A further essential constituent of the recording materials according to the invention is a conventional dimensionally stable support layer of glass, metal, polymethyl methacrylate, polycarbonate or polyethylene terephthalate, which may also have tracking grooves. These supports can take the form of a ribbon, of a square or rectangular sheet or of a round disk, in which case the conventional optically clear disks either 10 or 13 cm in diameter which are known for laser-optical recording materials are preferred.

In addition, the recording materials may have further layers, such as reflector layers, protective layers, adhesive layers or electrode layers.

Advantageous recording materials according to the invention consist of a support and an amorphous recording layer composed of known dyes and the phthalocyanines I, particularly advantageous ones consist of a support and an amorphous recording layer composed of the known phthalocyanines and the phthalocyanines I, and very particularly advantageous ones consist of a support and an amorphous recording layer composed of the phthalocyanines I.

The production of the recording materials according to the invention requires no special technical measures, being effected by the known method of applying thin phthalocyanine layers to supports by vapor deposition.

The recording materials according to the invention are written with analog or digital data by means of a write laser beam conventionally, for the writing of analog data an analog-modified continuous wave laser being used and for the writing of digital data a pulse-coded laser.

In general, suitable lasers show a beam power from 1 to 20 mW at write wavelength $\lambda$. The focus diameter of the write laser beam ranges in general from 300 to 2000 nm. In general, the pulse period for irradiation with a pulse-coded laser ranges from 10 to 1000 ns. Advantageously, the laser beam used for writing comprises light of wavelength $\lambda$ which is readily absorbed by the recording layer in question. Advantageous wavelengths $\lambda$ range from 400 to 1000 nm.

In the write process, the laser beam, which has been focussed on the recording layer, is guided over the recording material in a relative motion while being perpendicularly incident thereupon. At the point of incidence, the recording layer is locally heated, and thermally altered areas are formed, for example in the form of holes, pits or spots. When writing data with pulse-coded lasers, these areas have essentially a round or oval shape from 100 to 2000 nm in diameter, while when written using an analog-modified continuous wave laser they can have any desired shape.

The recording materials according to the invention are highly suitable for ablative and deformative laser-optical data recording. In addition, they are highly suitable for laser-optical data recording by phase transformation. This comprises writing the data in the form of thermally altered areas whose reflectivity is substantially increased compared with the unwritten areas, thereby producing a particularly strong optical contrast.

The writing of data in the recording layer can take place from the support remote side of the layer or through the optically clear support. The latter option is of particular advantage.

The written data are read by means of a read laser beam. The beam power of the read laser at the read wavelength $\lambda'$ is below the threshold power at which writing becomes possible. In general, the beam power ranges from 0.1 to 2 mW. It is advantageous to use laser light of the wavelength $\lambda'$ which is strongly reflected by the recording layer. Advantageous wavelengths $\lambda'$ range from 400 to 1000 nm, in particular from 630 to 900 nm.

In the read process too, the read laser beam, which is likewise focussed on the recording layer, is guided over the recording material in a relative motion and is perpendicularly incident thereupon.

If, in the course of scanning the recording layer, the read laser beam comes across a thermally altered area, for example a spot, the properties of the light transmitted or reflected by the recording material alter, which is detectable by means of suitable detectors.

Furthermore, the data in the recording layer can be read from the support remote side of the layer or through the optically clear, transparent support, the latter option being of advantage. It is particularly advantageous here to detect the reflected light.

It is also of very particular advantage to use for this purpose write and read lasers which emit laser radiation within the infrared wavelength region from 630 to 900 nm. It is further of advantage in this context if the write wavelength λ is identical to, or differs only little from, the read wavelength λ'. Light of these wavelengths is supplied by conventional semiconductor lasers.

The recording materials according to the invention are thus written in a preferred manner of the invention with pulse-coded laser light of the wavelength λ from 630 to 900 and in particular from 740 to 850 nm through the optically clear, transparent support to form thermally altered areas in the form of spots whose reflectivity is substantially increased compared with the unwritten areas.

Thereafter the written recording materials are read in a manner preferred according to the invention with laser light of a wavelength λ' from 630 to 900, in particular from 740 to 850 nm, from the side of the optically clear, transparent support while the light reflected by the recording layer is detected.

The recording materials according to the invention have numerous particular advantages. For instance, the unwritten recording layer is particularly stable, so that even after prolonged storage at comparatively high temperatures and relative humidities it is still highly suitable for laser-optical data recording. The same applies to the written recording layer; here there is no loss of information even on very prolonged storage. Furthermore, the recording material is highly suitable for laser-optical data recording by phase transformation. In this case, a particularly low write power is sufficient for writing the data, which leads to a remarkably high sensitivity which can even surpass that of existing tellurium layers. For this reason it is also possible to use write lasers having a comparatively low power output. In addition, the written recording materials have a particularly high optical contrast between written and unwritten areas, surpassing the hitherto known optical contrast of written phthalocyanine layers. Moreover, a bit density of substantially above $10^7$ bits/cm$^2$ is obtained on the recording materials according to the invention, and even then the data can be read immediately after writing. The recording materials according to the invention are also highly suitable for archival purposes.

EXAMPLES 1

Preparation and characterization of phthalocyanines I General method of preparation:

Mixtures of 250 mmol of o-phthalodinitrile, 30 mmol of an o-phthalodinitrile substituted in the 3- or 4-position by a radical R, and 62.5 mmol of $TiO_2$, $TiCl_4$, $V_2O_5$ or $VCl_3$ were heated at 200° C. for 2 hours and at 300° C. for 3 hours. After cooling down, the crude products were in each case heated with 200 ml of 10% strength hydrochloric acid and then, after the hydrochloric acid had been removed, first with 200 ml of 10% strength ammonia and then with 200 ml of methanol, which served to remove the soluble impurities out of the crude products.

After drying, the products thus obtained were extracted with methylene chloride to isolate the mixtures of monosubstituted and disubstituted phthalocyanines I.

The mixtures were separated into the corresponding monosubstituted and disubstituted phthalocyanines I by column chromatography over neutral alumina (activity level 3) using toluene, toluene/ethyl acetate (volume ratio 9:1) or methylene chloride as the eluent. Further separation of the disubstituted phthalocyanines I into their positional isomers was dispensed with.

The material composition of the phthalocyanines I thus obtained was determined by chemical elemental analysis and by mass spectrometry and was found to correspond to the calculated values.

The phthalocyanines I were characterized by means of their $R_f$ values determined by thin layer chromatography over silica and/or alumina. Table 1 summarizes the $R_f$ values found.

TABLE 1

$R_f$ values of monosubstituted or disubstituted phthalocyanines I:

| Example No. | Radical R | Number | Cation Me | (a) $R_f$ values over SiO$_2$ | Eluent | (b) Al$_2$O$_3$ | Eluent |
|---|---|---|---|---|---|---|---|
| 1.1 | 3-Si(CH$_3$)$_3$ | 1 | TiO$^{2\oplus}$ | 0.38 | A | 0.25 | A |
| 1.2 | 3-Si(CH$_3$)$_3$ | 2 | TiO$^{2\oplus}$ | 0.74 | A | 0.36 | A |
| 1.3 | 4-Si(CH$_3$)$_3$ | 1 | TiO$^{2\oplus}$ | 0.31 | B | 0.19 | B |
| 1.4 | 2-Si(CH$_3$)$_3$ | 1 | TiO$^{2\oplus}$ | 0.98 | B | 0.98 | B |
| 1.5 | 4-OCH$_3$ | 1 | VO$^{3\oplus}$ | 0.67 | B | 0.50 | B |
| 1.6 | 4-OCH$_3$ | 2 | VO$^{3\oplus}$ | 0.71 | B | 0.72 | B |
| 1.7 | 4-OCH$_3$ | 1 | VO$^{3\oplus}$ | 0.40 | C | 0.27 | C |
| 1.8 | 4-OCH$_3$ | 2 | VO$^{3\oplus}$ | 0.57 | C | 0.85 | C |
| 1.9 | 3-OC$_2$H$_5$ | 1 | VO$^{3\oplus}$ | 0.68 | B | 0.55 | B |
| 1.10 | 3-OC$_2$H$_5$ | 2 | VO$^{3\oplus}$ | 0.86 | B | — | |
| 1.11 | 4-OC$_2$H$_5$ | 1 | VO$^{3\oplus}$ | 0.55 | B | 0.68 | B |
| 1.12 | 3-OCH$_2$CH$_3$ | 1 | VO$^{3\oplus}$ | 0.62 | B | 0.57 | B |
| 1.13 | 3-OCH$_2$CF$_3$ | 1 | VO$^{3\oplus}$ | 0.62 | B | 0.57 | B |
| 1.14 | 3-OCH$_2$CF$_3$ | 1 | VO$^{3\oplus}$ | 0.78 | C | 0.92 | C |
| 1.15 | 4-OCH$_2$CF$_3$ | 1 | VO$^{3\oplus}$ | 0.21 | A | 0.27 | A |
| 1.16 | 4-(1,1,3,3-Tetramethylbutyl) | 1 | VO$^{3\oplus}$ | — | | 0.42 | A |
| 1.17 | 4-(1,1,3,3-Tetramethylbutyl) | 2 | VO$^{3\oplus}$ | — | | 0.72 | A |
| 1.18 | 3-p-Methylphenoxy | 1 | VO$^{3\oplus}$ | 0.07 | A | 0.07 | A |
| 1.19 | 3-p-Methylphenoxy | 2 | VO$^{3\oplus}$ | 0.21 | A | 0.16 | A |
| 1.20 | 3-p-Methylphenoxy | 1 | VO$^{3\oplus}$ | 0.69 | B | 0.48 | B |
| 1.21 | 3-p-Methylphenoxy | 1 | VO$^{3\oplus}$ | 0.86 | B | 0.80 | B |
| 1.22 | 3-Si(CH$_3$)$_3$ | 1 | VO$^{3\oplus}$ | 0.46 | A | 0.35 | A |

TABLE 1-continued

| | R_f values of monosubstituted or disubstituted phthalocyanines I: | | | (a) | | (b) | |
|---|---|---|---|---|---|---|---|
| Example No. | Radical R | Number | Cation Me | R_f values over SiO₂ | Eluent | Al₂O₃ | Eluent |
| 1.23 | 3-Si(CH₃)₃ | 2 | $VO^{3\oplus}$ | 0.73 | A | 0.57 | A |

Eluent A = toluene;
Eluent B = toluene/ethyl acetate in a volume ratio of 9:1;
Eluent C = toluene/ethyl acetate in a volume ratio of 3:1;
(a) Silica gel from Machery and Nagel, Polygram 0.2 mm N-HR UV 254;
(b) Al₂O₃ 60 neutral type E from Merck;

EXAMPLE 2

Use of phthalocyanines I for producing laser-optical recording materials

General method of production:

The phthalocyanines I 1.1 to 1.23 of Table 1 were vapor deposited in a conventional manner under dust-free conditions and under reduced pressure onto, in each case, one surface of optically clear, 1.2 mm thick round polycarbonate disks 130 mm in diameter. The vapor deposition conditions here were chosen in such a way as to produce approximately 120 nm thick recording layers.

The recording materials 1.1 to 1.23 thus obtained did indeed have approximately 120 nm thick recording layers, any fluctuations from this desired value being very small. In all cases, the recording layers were uniformly thick, free of cracks and amorphous over their entire area. Even six weeks of storage at 60° C. and a relative humidity of 90% produced no alterations in the layers.

The reflectivity of the recording layers of recording materials 1.1 to 1.23 was measured in a conventional manner from the polycarbonate disk side using light of the wavelength $\lambda=780$ nm. For every recording material the reflectivity was measured at 10 different points on the recording layer.

It was found that for a given recording material the reflectivities measured at the 10 different points did not differ from one another, which indicated the particularly high uniformity of the recording layer.

Nor were there any marked differences in the reflectivity between the individual recording materials 1.1 to 1.23; in general the reflectivity ranged from 16 to 18%. Thus all the phthalocyanines I 1.1 to 1.23 of Table 1 were highly suitable for producing laser-optical recording materials.

EXAMPLE 3

Laser-optical data recording by means of the recording materials 1.1 to 1.23 of the invention from Example 2

Test method:

For writing and reading the recording materials a conventional test drive was used, comprising (a) a pulse-coded write laser emitting light of wavelength $\lambda=830$ nm of maximum write power 10 mW, and (b) a read laser which continuously emitted light of a wavelength $\lambda'=780$ nm within the power range from 0.4 to 1 mW.

The test drive additionally had optical components by means of which the parallel laser beams of laser (a) and (b) were aligned colinearly for focussing with a common objective (NA=0.5) through the polycarbonate disks onto the recording layers. As a result, the points of incidence of the two laser beams were only about 10 μm apart from each other, so that as a consequence of the rotation of the disk it took only a few μs after the writing of a spot for the written spot to move past the focus of read laser (b) for detection.

To detect the spots, the light reflected by the recording layers through the polycarbonate disks was detected in a conventional manner.

All the recording materials 1.1 to 1.23 were written by means of the write laser (a) with continuous pulses (1 MHz square wave; duration of individual pulse: 500 ns) at a track speed of 4 ms$^{-1}$, the write power being varied between 1 and 10 mW. Immediately thereafter, ie. a few μs after being recorded, the spots obtained were read. This comprised measuring the amplitude of the pulses on the reflected read laser light caused by the spots and recording it as a function of the write power with which the spots in question had originally been produced. In this way it was determined which minimum write power was required under the abovementioned conditions to produce satisfactory signals, the basic prerequisite for data recording. In all cases this was found to be the case with a write power of 2.5 mW, which testified to the high sensitivity of the recording materials according to the invention.

In addition, the reflectivity of the spots for light of the wavelength $\lambda=780$ nm was determined. With all the recording materials investigated this was found to be 30%. This constituted a substantial increase compared with the reflectivity of the unwritten areas (16 to 18%) and was responsible for a particularly high optical contrast.

The written recording materials of the invention 1.1 to 1.23 were stored at 60° C. in a relative humidity of 90% for ten weeks. These storage conditions produced no adverse changes; afterwards the recorded data were still as flawlessly readable as before.

We claim:

1. A laser-optical recording element useful for the laser-optical recording of analog or digital data and which is capable of recording analog or digital data in the form of written areas or spots on a recording layer, said written areas or spots being formed by thermally altering areas or spots of the recording layer by phase transformation such that the written, thermally altered areas or spots show an increase in reflectivity compared to unwritten, unaltered areas and whereby no ablation or deformation leading to hole or pit formation takes place, said recording element consisting of (A) a dimensionally stable support layer and
(B) a thermally alterable amorphous laser-optical recording layer of a thickness from about 50 to about 160 nm consisting of one or more monosubstituted or disubstituted phthalocyanines I wherein the monosubstituted phthalocyanine has one radical as a substituent on one of its four benzene rings and wherein the disubstituted phthalocyanine I has one radical as a substituent on each of two of its four benzene rings, said radical being XR$^1$, where X is oxygen, sulfur, or imino and R$^1$ is C$_1$–C$_6$-alkyl, fluorinated $C_1$-$C_6$-alkyl or $C_6$-$C_{20}$-aryl; or $Se(R^2)_3$, where $R^2$ is $C_1$-$C_6$-alkyl.

2. The recording element of claim 1, wherein said phthalocyanine I is metal-free.

3. The recording element of claim 1, wherein said phthalocyanine I is metal-containing.

4. The recording element of claim 3, wherein said radical is methoxy, ethoxy, 2,2,2-trifluoroethoxy, 1,1,3,3-tetramethylbutoxy, phenoxy, p-methylphenoxy or trimethylsilyl and wherein a vanadinyl or titanyl cation is present.

5. The recording element of claim 1, wherein said phthalocyanine I is monosubstituted.

6. The recording element of claim 1, wherein said phthalocyanine I is disubstituted.

7. The recording element of claim 6, wherein both substituents are identical.

8. The recording element of claim 1, wherein said dimensionally stable support layer (A) is an optically clear disk of either 10 or 13 in diameter.

9. The recording element of claim 1, wherein said radical is $Si(R^2)_3$.

10. A method of recording analog or digital data by means of laser beams comprising:
   (1) irradiating a thermally alterable laser-optical recording element consisting of
      (A) a dimensionally stable support layer and
      (B) an amorphous recording layer of a thickness from about 50 to about 160 nm consisting of one or more monosubstituted or disubstituted phthalocyanines I, wherein the monosubstituted phthalocyanine I has one radical as a substituent on one of its four benzene rings and wherein the disubstituted phthalocyanine I has one radical as a substituent on each of two of its four benzene rings, said radical being $XR^1$, where X is oxygen, sulfur or imino and $R^1$ is $C_1$-$C_6$-alkyl, fluorinated $C_1$-$C_6$-alkyl or $C_6$-$C_{20}$-aryl; or $Se(R^2)_3$, where $R^2$ is $C_1$-$C_6$-alkyl;
   with a focussed analog-modified continuous wave laser beam or a pulse-coded laser beam guided over the laser-optical recording element in relative motion, said laser beam having a beam power high enough to cause a phase transformation in the irradiated areas of the laser-optical recording layer (B) and thereby produce thermally altered, written areas or spots which show an increase in reflectivity compared to unwritten, unaltered areas and by which no ablation or deformation leading to hole or pit formation takes place, to obtain a written laser-optical recording layer, and
   (2) detecting the areas of increased reflectivity in the written laser-optical recording layer by means of a laser beam guided in relative motion over said written laser-optical recording element, said laser beam having a beam power below the threshold power at which phase transformation becomes possible.

11. The method of claim 10, wherein said phthalocyanine I is metal-free.

12. The method of claim 10, wherein said phthalocyanine I is metal-containing.

13. The method of claim 12, wherein said radical is methoxy, ethoxy, 2,2,2-trofluoroethoxy 1,1,3,3-tetramethylbutoxy, phenoxy, p-methylphenoxy or trimethylsilyl and wherein a vanadinyl or titanyl cation is present.

14. The method of claim 10, wherein said phthalocyanine I is monosubstituted.

15. The method of claim 10, wherein said phthalocyanine I is disubstututed.

16. The method of claim 15, wherein both substitutents are identical.

17. The method of claim 10, wherein said radical is $(Si(R^2)_3$.

18. The method of claim 10, wherein said dimensionally stable support layer (A) is an optically clear disc of either 10 or 13 cm in diameter.

19. The method of claim 10, wherein the reflectivity of the unwritten areas for light of a wavelength $\lambda = 780$ nm is in the range of from 16 to 18% and the reflectivity of the written areas or spots for light of a wavelength $\lambda = 780$ nm is about 30%.

20. A written laser-optical recording element containing analog or digital data and consisting of
   (A) a dimensionally stable support layer and
   (B) a written recording layer thermally altered by means of write laser beam, the recording layer having a thickness of from about 50 to about 160 nm and consisting of one or more monosubstituted or disubstituted phahalocyanines I wherein the monosubsitituted phthalocyanine I has one radical as a substituent on one of its four benzene rings and wherein the disubstituted phthalocyanine I has one radical as a substituent on each of two of its four benzene rings, said radical being $XR^1$ where X is oxygen, sulfur or imino and $R^1$ is $C_1$-$C_6$-alkyl, fluorinated $C_1$-$C_6$-alkyl or $C_6$-$C_{20}$-aryl; or $Si(R^2)_3$, where $R^2$ is $C_1$-$C_6$-alkyl; the written recording layer containing analog or digital data in the form of written, thermally altered areas or spots which show an increase in reflectivity as compared with the unwritten areas and which contains no holes or pits resulting from ablation or deformation.

21. The written laser-optical recording element of claim 20, wherein the reflectivity of the unwritten areas for light of a wavelength $\lambda = 780$ nm is in the range of from 16 to 18% and the reflectivity of the written areas or spots for light of a wavelength $\lambda = 780$ nm is about 30%.

22. The written laser-optical recording element of claim 20, wherein said phthalocyanine I is metal-free.

23. The written laser-optical recording element of claim 20, wherein said phthalocyanine I is metal-containing.

24. The written laser-optical recording element of claim 23, wherein said radical is methoxy, ethoxy, 2,2,2-trifluoroethoxy, 1,1,3,3-tetramethylbutoxy, phenoxy, p-methylphenoxy or trimethylsilyl and wherein a vanadinyl or titanyl cation is present.

25. The written laser-optical recording element of claim 20, wherein said phthalocyanine I is monosubstituted.

26. The written laser-optical recording element of claim 20, wherein said phthalocyanine I is disubstituted.

27. The written laser-optical recording element of claim 26, wherein both substituents are identical.

28. The written laser-optical recording element of claim 26, wherein said dimensionally stable support layer (A) is an optically clear disc of either 10 or 13 cm in diameter.

* * * * *

UNITED STATES PATENT AND TRADEMARK OFFICE
CERTIFICATE OF CORRECTION

PATENT NO. : 4,946,762
DATED : August 7, 1990
INVENTOR(S) : Bernhard ALBERT et al.

It is certified that error appears in the above-identified patent and that said Letters Patent is hereby corrected as shown below:

Claim 1, Line 23 and Claim 10, Line 16

"$Se(R^2)_3$" should read --$Si(R^2)_3$--

Claim 8, Line 3 after "13" insert --cm--

Signed and Sealed this

Fifteenth Day of October, 1991

Attest:

HARRY F. MANBECK, JR.

Attesting Officer   Commissioner of Patents and Trademarks